United States Patent [19]

Loesch, deceased et al.

[11] Patent Number: 4,458,633
[45] Date of Patent: Jul. 10, 1984

[54] FLAMELESS NITROGEN SKID UNIT
[75] Inventors: Stanley B. Loesch, deceased, late of Duncan, Okla.; by Paul A. Loesch, administrator, Fairmont, Okla.
[73] Assignee: Halliburton Company, Duncan, Okla.
[21] Appl. No.: 264,361
[22] Filed: May 18, 1981
[51] Int. Cl.³ .................. F22B 3/06; F17C 7/02
[52] U.S. Cl. ................................ 122/26; 165/51; 62/52
[58] Field of Search ............. 237/123 R, 1 R; 122/26; 126/247, 19.5; 62/52, 51, 115; 165/51

[56] References Cited
U.S. PATENT DOCUMENTS

| | | |
|---|---|---|
| 1,107,368 | 8/1914 | Semmler . |
| 1,394,955 | 1/1922 | Von Recklinghausen . |
| 1,521,385 | 12/1924 | Messer . |
| 1,678,670 | 3/1928 | Crawford . |
| 1,826,248 | 10/1931 | Heylandt . |
| 1,930,731 | 10/1933 | Thompson . |
| 1,943,059 | 1/1934 | Dana . |
| 2,028,119 | 1/1936 | Boshkoff . |
| 2,035,396 | 3/1936 | Mesinger . |
| 2,040,059 | 5/1936 | Mesinger . |
| 2,089,428 | 8/1937 | Ross et al. . |
| 2,234,901 | 3/1941 | Jones . |
| 2,308,122 | 1/1943 | St. Clair . |
| 2,319,971 | 5/1943 | Bodine, Jr. . |
| 2,343,727 | 3/1944 | Zenner . |
| 2,359,219 | 9/1944 | Jones . |
| 2,362,968 | 11/1944 | Bliss et al. . |
| 2,363,960 | 11/1944 | Hansen . |
| 2,400,037 | 5/1946 | Arndt et al. . |
| 2,443,724 | 6/1948 | Cibulka . |
| 2,446,498 | 8/1948 | Underwood . |
| 2,499,462 | 3/1950 | Cooper . |
| 2,525,874 | 10/1950 | De Larzelere . |
| 2,539,291 | 1/1951 | Williamson et al. . |
| 2,548,051 | 4/1951 | Peck . |
| 2,576,984 | 12/1951 | Wildhack . |
| 2,576,985 | 12/1951 | Wildhack . |
| 2,645,906 | 2/1955 | Ryan . |
| 2,694,528 | 3/1955 | Ricks et al. . |
| 2,705,872 | 4/1955 | Thompson . |
| 2,729,203 | 1/1956 | Prendergast . |
| 2,748,570 | 6/1956 | Booth . |
| 2,752,758 | 8/1956 | Tann . |
| 2,761,286 | 9/1956 | Billue et al. . |
| 2,795,937 | 6/1957 | Sattler et al. . |
| 2,823,521 | 2/1958 | Enger et al. . |
| 2,833,121 | 5/1958 | Dorf . |
| 2,907,176 | 10/1959 | Tsunoda et al. . |
| 2,922,289 | 1/1960 | Freeman, Jr. . |
| 2,937,504 | 5/1960 | Riediger . |
| 2,960,839 | 11/1960 | Hoag . |
| 2,975,607 | 3/1961 | Bodle . |
| 2,983,107 | 5/1961 | Forrest . |
| 2,984,989 | 5/1961 | Garbarini . |
| 3,813,036 | 5/1974 | Lutz ........................... 122/26 |
| 3,844,475 | 10/1974 | Kesterson et al. . |
| 3,851,629 | 12/1974 | Mayr et al. . |
| 4,164,660 | 8/1979 | Palazzetti . |
| 4,264,826 | 4/1981 | Ullmann . |

FOREIGN PATENT DOCUMENTS 153491 2/1952 Australia .
2002057 6/1972 United Kingdom .

OTHER PUBLICATIONS
U.S. Patent Application Ser. Nos. 136,047, 136,049 of Loesch et al., filed Mar. 31, 1980.

Primary Examiner—Albert J. Makay
Assistant Examiner—Henry Bennett
Attorney, Agent, or Firm—Thomas R. Weaver; James R. Duzan

[57] ABSTRACT

A flameless nitrogen vaporizing unit includes a first internal combustion engine driving a nitrogen pump through a transmission. A second internal combustion engine drives three coolant circulation pumps against a variable back pressure so that a variable load may be imposed upon the second engine. Liquid nitrogen is pumped from the nitrogen pump driven by the first engine into a first heat exchanger where heat is transferred from exhaust gases from the first and second internal combustion engines to the liquid nitrogen to cause the nitrogen to be transformed into a gaseous state. The gaseous nitrogen then flows into a second heat exchanger where it is superheated by an engine coolant fluid to heat the gaseous nitrogen to essentially an ambient temperature. The superheated nitrogen is then injected into the well. The engine coolant fluid is circulated in a coolant circulation system by the coolant circulation pumps. Methods of vaporizing nitrogen are also disclosed.

10 Claims, 9 Drawing Figures

FLAMELESS NITROGEN SKID UNIT

The present invention relates generally to apparatus for heating fluids, and more particularly, but not by way of limitation, to a flameless heater adapted for superheating liquid nitrogen for use in gel fracturing operations on offshore oil and gas wells.

Numerous operations are performed on oil and gas wells which require large volumes of nitrogen gas. These operations may be performed on both onshore and offshore wells. Such operations include foam fracturing operations, acidizing services, jetting down the tubing or down the tubing-casing annulus, nitrogen cushions for drill stem testing, pressure testing, insulation of the tubing-casing annulus to prevent such problems as paraffin precipitation, jetting with proppant for perforating and cutting operations, reduction of density of well workover fluids, displacement of well fluid from tubing during gun perforation operations to prevent excess hydrostatic pressure in the hole from pushing perforation debris into the formation, placing corrosion inhibitors by misting the inhibitor with nitrogen, extinguishing well fires, and other operations. The present invention may be utilized with any of these operations.

One particular such operation with relation to which the following disclosure is made is the fracturing of a subsurface formation of the well by pumping a fluid under very high pressure into the formation. The fracturing fluid which is pumped into the well often comprises a foam gel which is produced by the use of nitrogen gas.

The nitrogen for the foam fracturing operation is generally stored in a liquid form at temperatures of approximately $-320°$ F.

For pressures encountered in these foam fracturing operations, the nitrogen changes state from a liquid to a gas at approximately $-200°$ F. It is, therefore, desirable to heat up the nitrogen gas to a superheated state so that the foam fracturing fluid being pumped down the well will be at an essentially ambient temperature. This is because of the numerous adverse affects upon mechanical equipment of very low temperature which would otherwise be presented by the nitrogen foam.

For land based wells, the nitrogen heating equipment generally includes open flame heaters. A futher problem is however, presented when performing foam fracturing operations on offshore wells. For safety and environmental reasons, open flames are not generally allowed on an offshore drilling platform. Therefore, it is necessary to provide a heater for the nitrogen which does not have an open flame.

Such flameless nitrogen heaters have previously been provided by utilizing heat generated by an internal combustion engine and mechanical components driven thereby to heat a coolant fluid which transferred that heat to the nitrogen through a coolant fluid-to-nitrogen heat exchanger.

The present invention is an improvement over the flameless nitrogen skid units disclosed in U.S. patent application Ser. Nos. 136,047 of Loesch et al. now U.S. Pat. No. 4,438,729 and 136,049 of Loesch et al., now abandon both filed Mar. 31, 1980.

The flameless nitrogen vaporizing unit of the present invention includes a first internal combustion engine driving a nitrogen pump through a transmission. Connected to the transmission is a transmission retarder for varying the load on the first internal combustion engine by varying a level of hydraulic fluid present in the transmission retarder. A second internal combustion engine drives three coolant circulating pumps against a variable back pressure so that a variable load may be imposed upon the second engine.

Liquid nitrogen is pumped from the nitrogen pump driven by the first engine into a first heat exchanger where heat is transferred from exhaust gases from the first and second internal combustion engines to the liquid nitrogen to cause the nitrogen to be transformed into a gaseous state. The gaseous nitrogen then flows into a second heat exchanger when it is superheated by an engine coolant fluid to heat the gaseous nitrogen to essentially an ambient temperature. The superheated nitrogen is then injected into the well.

The engine coolant fluid flows in a coolant circulation system wherein it receives heat from several sources. Heat is transferred to the coolant fluid directly from the internal combustion engines. Heat is transferred to the coolant fluid from transmission fluid which flows through the transmission of the first internal combustion engine and the transmission retarder thereof. Heat is also provided to the coolant fluid in the coolant circulating pumps and from a discharge pressure control means which varies the back pressure on the coolant circulating pumps.

The coolant fluid circulating system includes a comingling chamber for comingling warmer coolant fluid flowing from the internal combustion engines to the coolant fluid-to-nitrogen heat exchanger with cooler coolant fluid flowing from the coolant fluid-to-nitrogen heat exchanger to the internal combustion engines. This aids in controlling the temperatures of the internal combustion engines to prevent overcooling of the same.

Numerous features and advantages of the present invention will be readily apparent to those skilled in the art upon a reading of the following disclosure when taken in conjunction with the accompanying drawings.

FIG. 6 is a sectional view of the nitrogen vaporizer discharge manifold showing the connection of a bypass line thereto for bypassing liquid nitrogen around both the exhaust gas-to-nitrogen heat exchanger and the coolant fluid-to-nitrogen heat exchanger;

Figure 1:
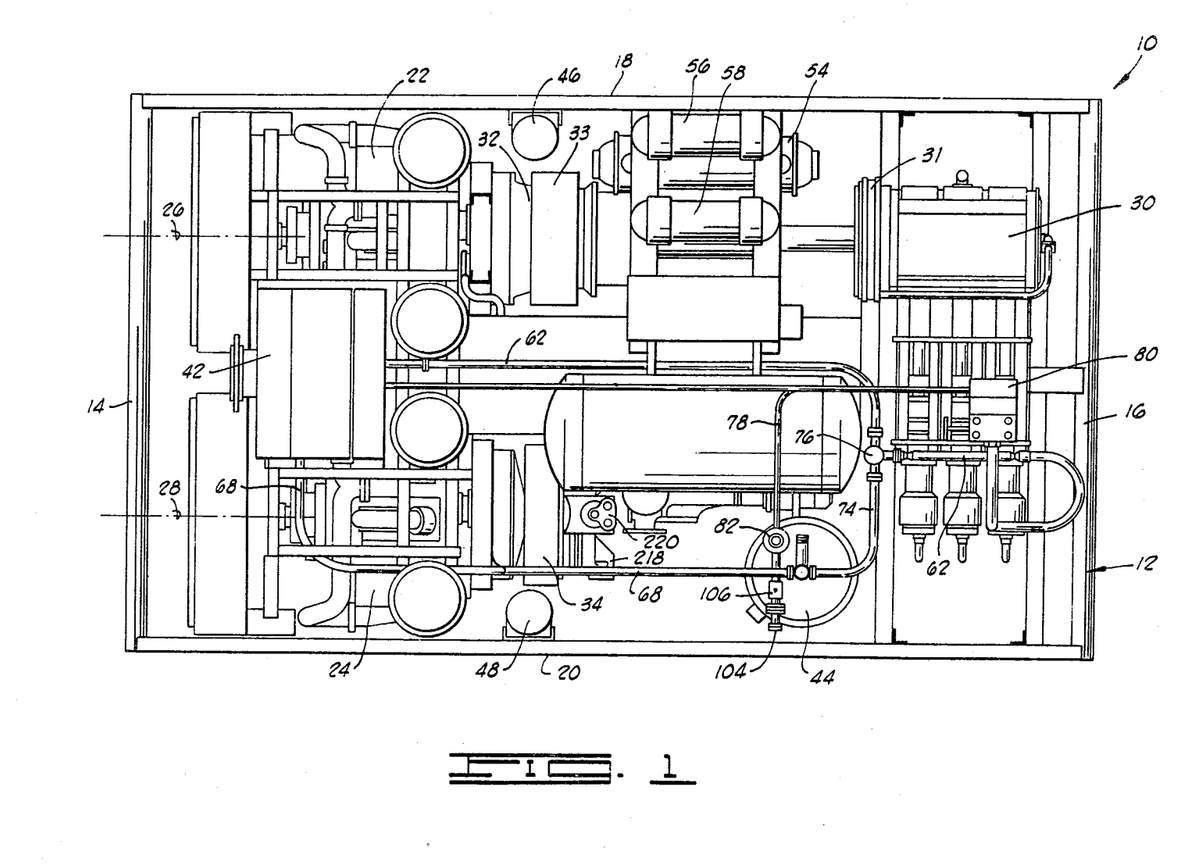
FIG. 1 is a plan view of the flameless nitrogen unit of the present invention.
Figure 2:
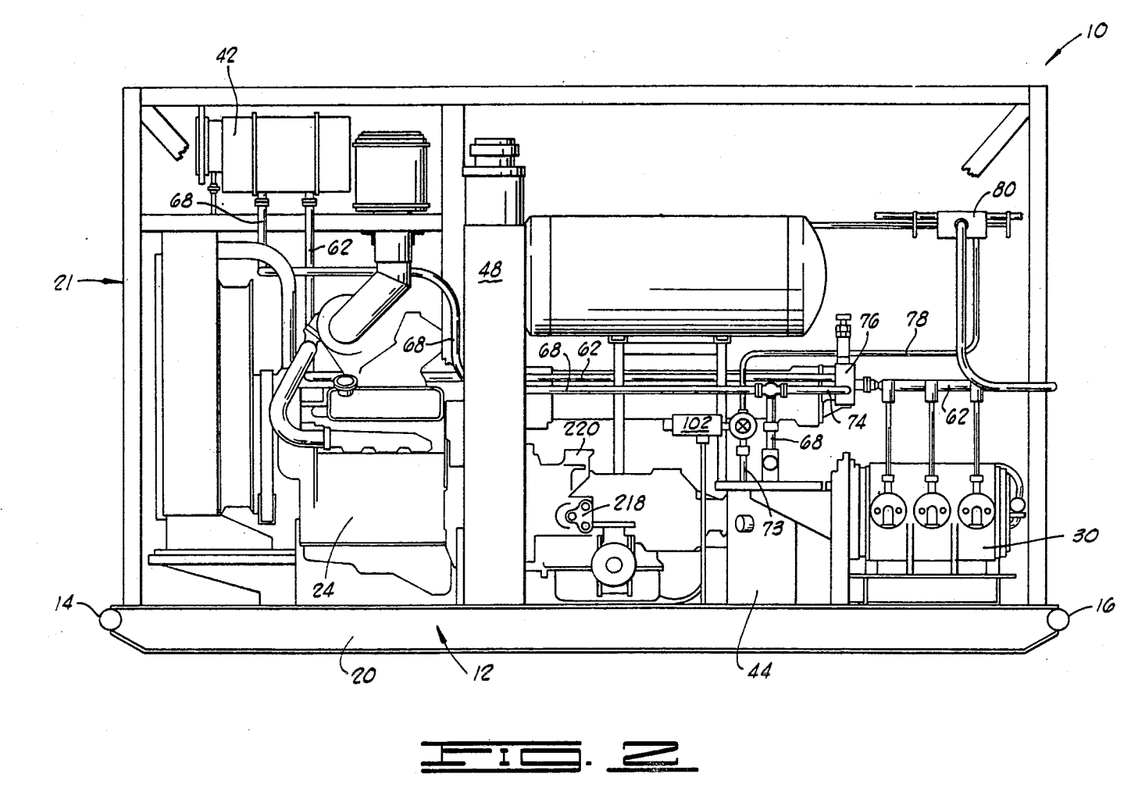
FIG. 2 is a left side elevation view of the apparatus of FIG. 1.

Referring now to the drawings and particularly to FIGS. 1 and 2, the flameless nitrogen vaporizing unit of the present invention is shown and generally designated by the numeral 10. The vaporizing unit 10 may generally be referred to as an apparatus for heating a first fluid, said fluid being the liquid nitrogen.

The apparatus 10 includes a rectangular transportable skid frame 12 having first and second opposed sides 14 and 16, and having third and fourth opposed sides 18 and 20. The first and second sides 14 and 16 define a width of frame 12, which width is approximately 95 inches in a preferred embodiment. The third and fourth sides 18 and 20 define a length of frame 12 which length is approximately 168 inches in a preferred embodiment.

The vaporizing apparatus 10 is surrounded by a protective cage 21 which, in a preferred embodiment, has a height of 96 inches. The protective cage 21 is not shown in FIG. 1 so that the other components may be more clearly illustrated.

Mounted upon the frame 12 are first and second internal combustion engines 22 and 24, respectively, which may also be referred to as first and second power sources. In a preferred embodiment, engines 22 and 24 are General Motors 6V-92T diesel engines. Engines 22 and 24 are oriented upon frame 12 so that the respective axes of rotation, 26 and 28, of the crank shafts of engines 22 and 24 are oriented substantially parallel to third and fourth sides 18 and 20 of frame 12.

A compressed air system is provided on the apparatus 10 with an air compressor driven by first engine 22 connected to a compressed air storage tank for use with compressed air driven starters on the engines 22 and 24.

A nitrogen pump 30, which may also be referred to as a main pump, is located on frame 12 between the first engine 22 and second side 16 of frame 12. In a preferred embodiment pump 30 is preferably a Halliburton HT-150 positive displacement pump having Linde HP-60 fluid ends.

Nitrogen pump 30 is drivingly connected to first engine 22 by transmission means 32 and by a gear reduction box 31. In a preferred embodiment transmission 32 is an Allison HT-750 transmission, and gear reduction box 31 provides a 5-to-1 gear reduction between transmission 32 and pump 30.

The transmission 32 is equipped with a hydraulic transmission retarder 33 of a design well known to those skilled in the art which operates in a manner similar to that of a torque convertor with a load exerted on the transmission by the transmission retarder being dependent upon a controllable level of a transmission fluid present in the transmission retarder. The higher the fluid level in the retarder is, the higher the load exerted will be.

The second engine 24 has a triple pump drive unit 34 attached to the rear end thereof to which are drivingly connected first, second and third coolant fluid pumps 218, 220 and 222 two of which can be seen in FIG. 1.

The exhaust systems from engine 22 and 24 are connected to an exhaust gas-to-nitrogen heat exchanger 42 which is located between and above the engines 22 and 24 as shown in FIGS. 1 and 2. The exhaust heat exchanger 42 is a means for transferring heat energy from the exhaust gases produced by engines 22 and 24 directly to the nitrogen flowing through the tube side of exchanger 44. The term "directly" is used to indicate that the heat energy is not passed through any intermediate heat transfer fluid medium between the exhaust gas and the nitrogen.

A coolant fluid-to-nitrogen heat exchanger 44 is located behind second engine 24 near the fourth side 20 of frame 12, for transferring heat from the coolant fluid directly to the nitrogen.

First and second coolant fluid comingling chambers 46 and 48 are located near third and fourth sides 18 and 20, respectively, of frame 12 just to the rear of first and second engines 22 and 24, respectively.

Located above transmission 32 are a plurality of heat exchangers for transferring heat energy from various sources on the apparatus 10 to the engine coolant fluid which circulates through the cooling systems of the engines 22 and 24. These heat exchangers include the following.

A transmission cooler 54 is provided for transferring heat energy from the transmission fluid circulating throught transmission 32, and its associated transmission retarder 33, to the coolant fluid.

First and second nitrogen pump coolers 56 and 58, respectively, are provided for transferring heat energy from a lubricating fluid circulating through nitrogen pump 30 to the coolant fluid. Nitrogen pump coolers 56 and 58 may also be referred to as nitrogen pump lubricating fluid-to-coolant fluid heat exchangers.

Figure 3:
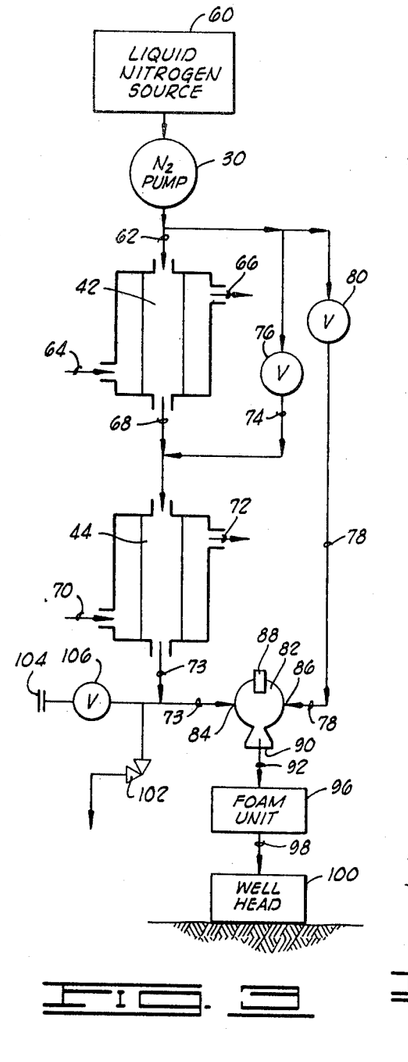
FIG. 3 is a schematic representation of the nitrogen flow system.

Referring now to FIG. 3, a schematic flow diagram is shown for the nitrogen system of the nitrogen heating apparatus 10. The nitrogen pump 30 takes liquid nitrogen from a liquid nitrogen source 60 which, in a preferred embodiment, has a capacity of approximately 2,000 gallons. The liquid nitrogen source 60 is not located on frame 12. A discharge line 62 connects the discharge of nitrogen pump 30 to the tube side of exhaust heat exchanger 42.

Hot exhaust gases from engines 22 and 24 are passed through the shell side of exchanger 42 as indicated by arrows 64 and 66.

The liquid nitrogen from pump 30 enters exhaust heat exchanger 42 at a temperature of approximately $-320°$ F. The heat supplied by exhaust exchanger 42 is approximately sufficient to vaporize the nitrogen and the vaporized nitrogen exits exhaust exchanger 42 by means of conduit 68 at a temperature of approximately $-200°$ F.

Figure 4:
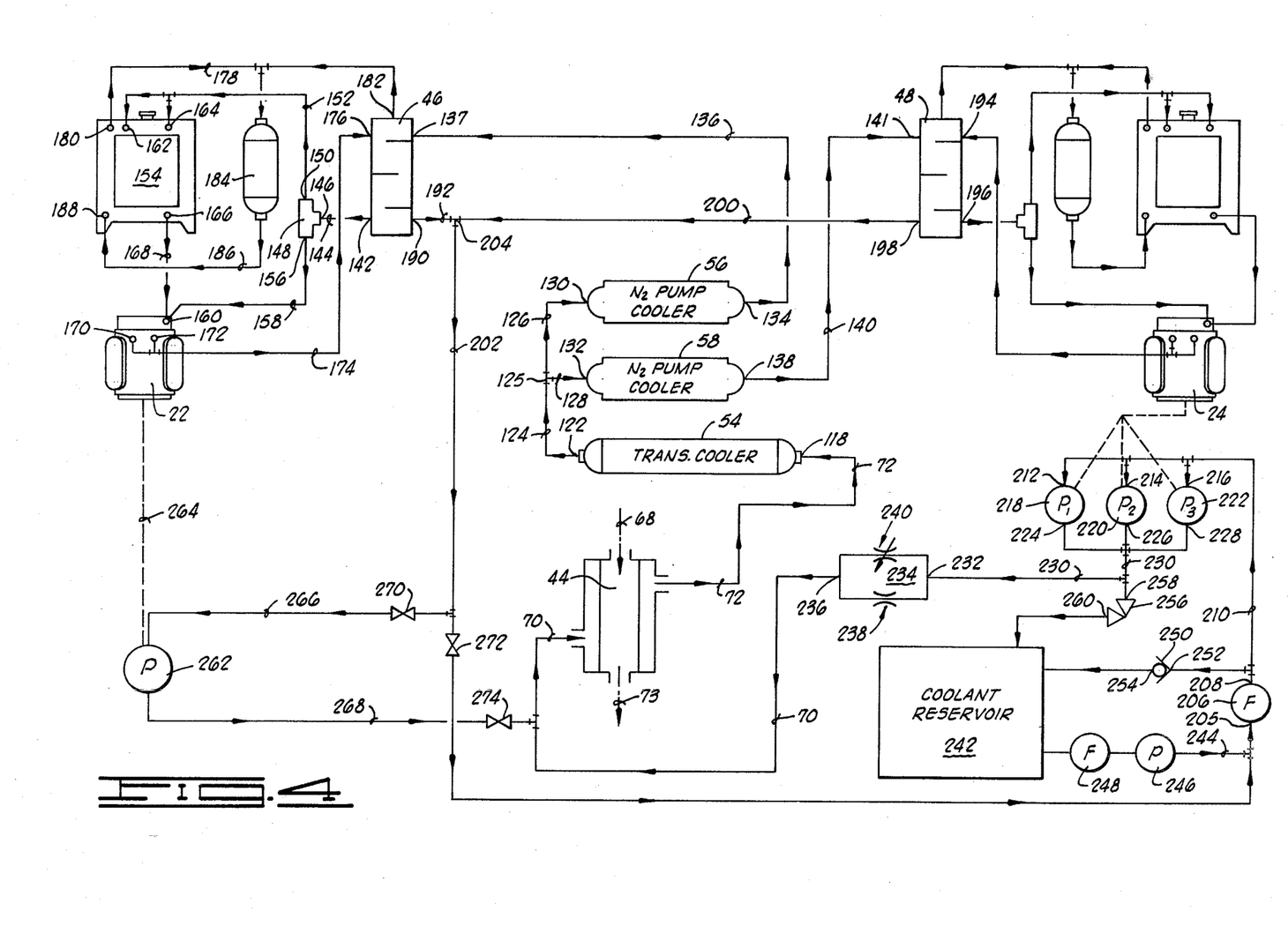
FIG. 4 is a schematic representation of the coolant flow circulating system.

Conduit 68 directs the vaporized nitrogen into the tube side of coolant fluid-to-nitrogen heat exchanger 44. Warm coolant fluid from the system generally shown in FIG. 4 is passed through the shell side of exchanger 44 as indicated by arrows 70 and 72. The heat transferred from the coolant fluid to the vaporized nitrogen in coolant fluid heat exchanger 44 superheats the vaporized nitrogen to approximately ambient temperatures of 70° F.$\pm 20°$ F. at conduit 73 exiting exchanger 44.

As is shown in FIG. 3, the exhaust heat exchanger 42 and the coolant heat exchanger 44 are so arranged relative to the direction of flow of the nitrogen that the exhaust heat exchanger 42 is located upstream of the coolant heat exchanger 44.

A first bypass conduit means 74 is provided by bypassing liquid nitrogen past exhaust heat exchanger means 42. Disposed in first bypass conduit 74 is a manually operable control valve 76 which provides a means for controlling the amount of liquid nitrogen which is bypassed around exhaust heat exchanger 42 so that a controlled portion of nitrogen is so bypassed.

A second bypass conduit means 78 provides a means for bypassing liquid nitrogen past both the exhaust heat exchanger means 42 and the coolant heat exchanger means 44. Disposed in second bypassing conduit 78 is a manually operable control valve 80, which is a needle valve, by means of which the amount of liquid nitrogen passed through second bypass conduit 78 may be controlled.

The first and second bypass conduit means 74 and 78 are connected in parallel so that the second bypass means 78 is operable independent of first bypass means 74 allowing liquid nitrogen to be bypassed through either one or both of the bypass means.

Discharge conduit 73 from coolant heat exchanger means 44 and second bypass conduit 78 are both connected to a discharge manifold 82.

Discharge manifold 82 is shown in section in FIG. 6. Discharge manifold 82 includes a first inlet 84 to which is connected conduit 73, and a second inlet 86 to which is connected bypass conduit 78.

A thermowell 88 is disposed in manifold 82 so that a temperature indicating means (not shown) may be connected thereto to measure the temperature of the superheated nitrogen which is discharged from manifold 82 through outlet 90 thereof. The outlet 90 is connected to a nitrogen discharge line 92 which directs the superheated nitrogen vapors to a foaming unit 96 where the nitrogen gas is used to produce the fracturing gel solution which is in turn directed through a conduit 98 to the well head 100 of the well which is being treated.

Connected to the conduit 73 between coolant heat exchanger means 44 and discharge manifold 82 is a safety relief valve 102 and an access flange 104 adjacent an access valve 106.

Referring now to FIG. 4, there is thereshown a schematic flow diagram for the coolant fluid which flows through the shell side of coolant fluid heat exchanger 44 as indicated by arrows 70 and 72 on FIG. 3.

In FIG. 4, coolant fluid-to-nitrogen heat exchanger means 44 is shown schematically in a manner similar to that in which it is shown in FIG. 3. Conduits leading into and out of the shell side of exchanger 44 are designated by numerals 70 and 72, respectively, corresponding to the arrows 70 and 72 of FIG. 3. The warm coolant fluid enters heat exchanger 44 through conduit 70 and in the exchanger 44 transfers heat to the nitrogen flowing through the tube side of exchanger 44, as indicated by arrows 68 and 73 shown in phantom lines, and a cooler coolant fluid exits exchanger 44 by means of conduit 72.

The other end of conduit 72 is attached to a tube side inlet 118 of transmission cooler 54. A tube side outlet 122 of transmission cooler 54 is connected to a conduit 124 which in turn is connected to hydraulically parallel conduits 126 and 128 leading to tube side inlets 130 and 132 of first and second nitrogen pump coolers 56 and 58, respectively.

A tube side outlet 134 of first nitrogen pump cooler 56 is connected to a first inlet 137 of first comingling chamber 46 by a conduit 136. A tube side outlet 138 of second nitrogen pump cooler 58 is connected to a first inlet 141 of second comingling chamber 48 by a conduit 140.

Figure 7:
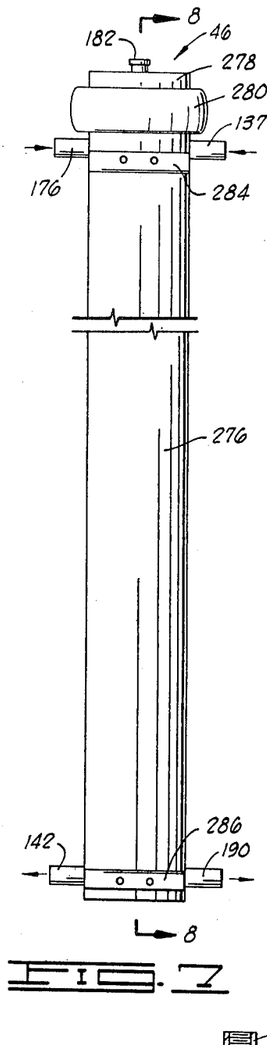
FIG. 7 is an elevation view of one of the coolant fluid comingling chambers.
Figure 8:
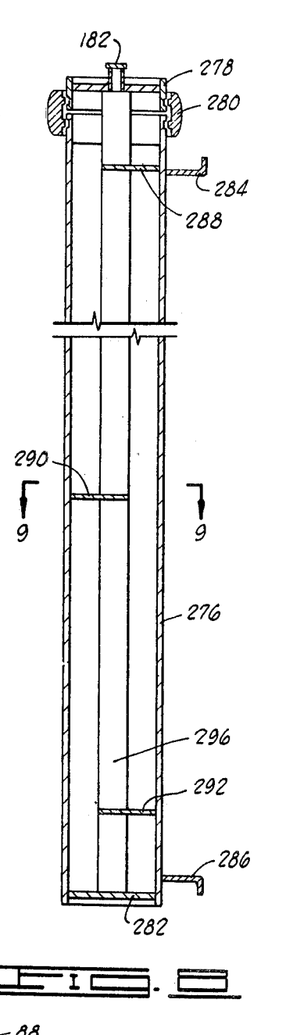
FIG. 8 is a sectional elevation view along line 8—8 of FIG. 7.
Figure 9:
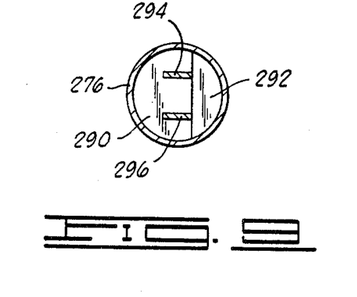
FIG. 9 is a horizontal section view about line 9—9 of FIG. 8.

The details of construction of comingling chambers 46 and 48 are shown in detail in FIGS. 7-9.

Coolant fluid exits a first outlet 142 of comingling chamber 46 through a conduit 144. The other end of conduit 144 is connected to an inlet 146 of a three-way thermostatically controlled valve 148.

A first outlet 150 of valve 148 is connected to a conduit 152 for directing coolant fluid to a radiator 154. A second outlet 156 of valve 148 is connected to a conduit 158 for directing coolant fluid to an inlet 160 of the water jacket of first engine 22.

Depending upon the temperature of the coolant fluid entering thermostatically controlled valve 148, the coolant fluid is directed to one of first and second outlets 150 and 156. If the coolant fluid is too hot it is directed to first outlet 150 and to conventional radiator 154 where the coolant fluid is cooled by heat exchange with air flowing past the outside of radiator 154. Otherwise, the coolant fluid is directed to second outlet 156 and directly to the inlet 160 of the water jacket of first engine 22.

The coolant fluid directed through conduit 152 to radiator 154 enters the tube side of radiator 154 through inlets 162 and 164.

That coolant fluid then exits a tube side outlet 166 of radiator 154 and is directed to inlet 160 of the water jacket of first engine 22 by a conduit 168.

All of the coolant fluid which enters inlet 160 of the water jacket of first engine 22 exits the water jacket at outlets 170 and 172 and flows through a return line 174 to a second inlet 176 of comingling chamber 46. A conventional engine coolant pump (not shown) pumps coolant fluid from the water jacket into return line 174.

An overflow conduit means 178 is connected to an overflow outlet 180 of radiator 154 and an overflow outlet 182 of first comingling chamber 46. Overflow conduit 178 is connected to a first surge tank 184 from which a coolant fluid make-up conduit 186 directs coolant fluid to a make-up inlet 188 of first radiator 154. Surge tank 184 serves to de-aerate the coolant fluid and provide make-up fluid.

All of the coolant fluid which flows from first comingling chamber 46 through conduit 144 eventually returns through the conduit 174 to the second inlet 176 of comingling chamber 46 as previously described. The coolant fluid entering second inlet 176 which has just been heated by the first engine 22 is physically mixed with or comingled with the cooler coolant fluid entering first inlet 137 within the comingling chamber 46.

A portion of this comingled coolant fluid is that which was previously described as exiting first outlet 142 of comingling chamber 46. A second portion of the comingled coolant fluid within the chamber 46 exits second outlet 190 of comingling chamber 46 by means of conduit 192.

The temperature of the coolant fluid entering first inlet 137, in a preferred embodiment, is approximately 160° to 170° F. The temperature of the coolant fluid entering second inlet 176 is approximately 190° F. The temperature of the coolant fluid exiting first and second outlets 142 and 190 is approximately 180° F. for each outlet.

The comingling chamber 46 serves to raise the temperature of the coolant fluid directed to the coolant system of first engine 22 higher than it would be if the comingling chamber 46 were eliminated and the conduit 136 were connected directly to the conduit 144. This helps prevent over-cooling of the first engine 22 and prevents the mechanical problems which can arise as a natural consequence of over-cooling an internal combustion engine.

The entire system shown in FIG. 4 may generally be referred to as a coolant system means.

The various conduits which return the coolant fluid from engines 22 and 24 to the heat exchanger 44 may generally be described as a first coolant fluid conducting means, and the various conduits conducting coolant fluid from coolant fluid heat exchanger 44 to the first and second engines 22 and 24 may generally be described as a second coolant fluid conducting means.

All of the various heat exchangers, comingling chambers, radiators, surge tanks, pumps and the like shown in FIG. 4 may generaly be described as being disposed in one of these first or second coolant fluid conducting means.

The second coolant fluid conducting means supplying fluid from exchanger 44 to the engines 22 and 24 splits into two parallel streams at the tee 125. The two parallel streams are again combined at the tee 204 in the first coolant fluid conducting means. The first and second engines 22 and 24 may therefore, be said to be connected in parallel between the first and second coolant fluid conducting means, so that the coolant fluid flowing from the second coolant fluid conducting means to the first coolant fluid conducting means is split into first and second coolant fluid streams flowing past said first and second internal combustion engines 22 and 24, respectively.

The comingling chambers 46 and 48 may each be generally referred to as a transfer means, connected to the first and second coolant fluid conducting means between the engines 22 and 24 and the heat exchanger means 44, for transferring heat energy from coolant fluid in the first coolant fluid conducting means to coolant fluid in the second coolant fluid conducting means.

The comingling chamber 46 could be replaced by a more conventional heat exchanger which does not mix the fluid flowing to and from engine 22, but due to the fact that the fluids are identical and the temperature differential is small the comingling chamber is preferred because it provides a much larger heat exchange than would a conventional shell and tube exchanger of similar physical size.

The conduits connecting second comingling chamber 48 with second engine 24 are similar to that just described between first comingling chamber 46 and first engine 22.

The second comingling chamber 48 includes the first inlet 141 and a second inlet 194. It also includes first and second outlets 196 and 198. Second outlet 198 is connected to a conduit 200.

Conduits 192 and 200 returning coolant fluid from comingling chambers 46 and 48 both connect to a common return line 202 at a tee connection 204.

Return conduit 202 is connected to an inlet 205 of a filter 206. An outlet 208 of filter 206 is connected to a suction line 210 which is connected to suction side inlets 212, 214 and 216 of first, second and third coolant fluid pumps 218, 220 and 222. Pumps 218, 220 and 222 are drivingly connected to second engine 24 as indicated in dashed lines.

Discharge sides 224, 226 and 228 of pumps 218, 220 and 222 are connected to a discharge line 230 which is connected to an inlet 232 of a discharge pressure control means 234. An outlet 236 of discharge pressure control means 234 is connected to the conduit 70 which has previously been described as connected to the inlet of the shell side of coolant fluid heat exchanger 44.

Control means 234 includes a fixed orifice 238 and a variable orifice 240.

The back pressure or discharge pressure against coolant pumps 218, 220 and 222 is varied by varying the size of variable orifice 240.

Heat is generated and transferred to the coolant fluid as it is pumped through the pumps 218, 220 and 222 and as it drops across the restriction in discharge pressure control means 234.

Pumps 218, 220 and 222 may be described as a variable load coolant pump means, drivingly connected to second engine 24, for pumping the coolant fluid against a controlled variable discharge pressure and for thereby exerting a varying load on second engine 24 so that an amount of heat energy transferred from second engine 24 to the coolant fluid and from the coolant fluid to the nitrogen increases as the discharge pressure of the coolant pump means is increased.

A supply of coolant fluid is maintained in a coolant fluid reservoir 242. A coolant fluid charge line 244 connects reservoir 242 to conduit 202 upstream of the coolant pumps 218, 220 and 222. A coolant charge pump 246 is disposed in charge line 244 for supplying coolant fluid to the suction sides 212, 214 and 216 of coolant pumps 218, 220 and 224. A filter 248 is disposed in charge line 244 upstream from charge pump 246.

A suction side relief valve 250 has an inlet 252 communicated with conduit 210, and has an outlet 254 commnicated with reservoir 242, for limiting a suction side pressure supplied to coolant pumps 218, 220 and 222.

A discharge side relief valve 256 has an inlet 258 communicated with conduit 230, and has an outlet 260 communicated with reservoir 242, for limiting the discharge pressure of coolant pumps 218, 220 and 222.

Referring to the lower left corner of FIG. 4, an auxiliary coolant pump 262 is thereshown, drivingly connected to first engine 22 by a power take-off as indicated by dashed line 264. Pump 262 provides a means for circulating the coolant fluid when only the first engine 22 is being operated.

Suction and discharge lines 266 and 268 connect pump 262 to conduits 202 and 70, respectively. Valves 270, 272 and 274 provide a means for selectively placing pump 262 in the coolant circulating system or blocking pump 262 out.

When it is desired to run only engine 22, and is thus necessary to use auxiliary coolant pump 262, valves 270 and 274 are opened and valve 272 is closed. When both engines 22 and 24 are running, valve 272 is opened and valves 270 and 274 are closed.

The details of construction of comingling chamber 46 are shown in FIGS. 7-9. Second comingling chamber 48 is similarly constructed. FIG. 7 is an outer elevation view of comingling chamber 46.

Comingling chamber 46 includes a vertically oriented cylindrical housing 276 to which the inlets 137 and 176 and the outlets 142 and 190 are connected.

A cap 278 is connected to the upper end of housing 276 by a locking collar 280. The overflow outlet 182 is attached to cap 278.

Referring now to FIG. 8 a sectional elevation view about line 8—8 of FIG. 7 is thereshown. A base plate 282 seals the lower end of cylindrical housing 276. First and second mounting brackets 284 and 286 are attached to the outer surface of housing 276 for attaching the same to the frame 12 of the flameless nitrogen vaporizing unit 10.

Inside the housing 276 are first, second and third baffles 288, 290 and 292.

As is best shown in FIG. 9 which is a horizontal section view along line 9—9 of FIG. 8, the baffles are attached to two central vertically oriented parallel support legs 294 and 296 which set in rectangular cut-out spaces in the baffles. The baffles are attached to the support legs 294 and 296 by welding or other suitable means.

The operation of the comingling chamber 46 is as follows. The cooler coolant fluid enters first inlet 137 and the warmer coolant fluid enters second inlet 176 and the two streams of fluid begin comingling with each other above first baffle 288. As the comingling fluid flows downward through comingling chamber 46 to the outlets 142 and 190, the direction of the fluid is deflected twice by the second and third baffles 290 and 292 to insure thorough mixing or comingling of the two liquid streams so that the liquid exiting the two outlets 142 and 190 is essentially of the same temperature at each of those outlets.

Figure 5:
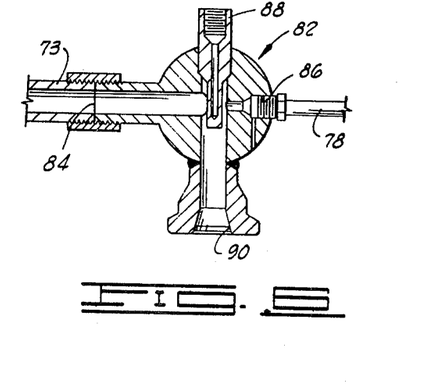
FIG. 5 is a schematic representation of the flow of lube oil from the nitrogen pump to the lube oil-to-coolant fluid exchangers and the flow of the transmission fluid from the transmission to the transmission-to-coolant fluid exchanger.

Referring now to FIG. 5, a schematic flow diagram is shown for the shell side fluids of the transmission cooler 54 and the nitrogen pump coolers 56 and 58. The flow of coolant fluid through the tube sides of those exchangers is represented by phantom lines in a manner similar to that shown in FIG. 4 for aid in correlation of the two drawings.

In the lower portion of FIG. 5, the first internal combustion engine 22, the transmission 32 and transmission retarder 33 are there schematically illustrated.

An outlet 298 from transmission 32 and transmission retarder 33 is connected to a suction side of transmission fluid pump 300 by a conduit 302. The discharge from pump 300 is connected to a shell side inlet 304 of transmission cooler 54 by a conduit 306. A shell side outlet 308 of transmission cooler 54 is connected to a conduit 310 the other end of which is connected to a filter 312. The outlet from filter 312 is connected to a return conduit 314 which is connected to an inlet 316 of transmission 32 and transmission retarder 33. The transmission fluid is heated by the friction incurred in the transmission 32 and transmission retarder 33 and that heat is transferred to the coolant fluid by means of transmission cooler 54.

Referring now to the upper portion of FIG. 5, the circulation system for lubricating oil for the nitrogen pump 30 is thereshown. A lubricating oil manifold which distributes lubricating oil to the various moving parts of nitrogen pump 32 is represented schematically by nitrogen pump lube manifold 318. The lubrication oil is heated as it flows through the manifold 318. The lubrication oil from manifold 318 is carried by a conduit 320 to the gear reduction box 31 which was previously described with relation to FIG. 1. The gear reduction box 31 connects transmission 32 to nitrogen pump 30. The lubrication oil is then carried from gear reduction box 31 by a conduit 322 to a lubricating oil reservoir 324.

A lube oil pump 326 has a suction thereof connected to the lube oil reservoir 324 by a conduit 328. A discharge side of pump 326 is connected to a shell side inlet 330 of first nitrogen pump cooler 56 by a conduit 332.

A shell side outlet 334 of first nitrogen pump cooler 56 is connected to a shell side inlet 336 of second nitrogen pump cooler 58 by a conduit 338. A shell side outlet 340 of second nitrogen pump cooler 58 is connected to a conduit 342.

Conduit 342 is connected to an inlet of filter 344. The outlet of filter 344 is connected to the inlet of nitrogen pump lube manifold 318 by a conduit 346, thereby completing the circulating loop for the lube oil.

A safety relief valve 348 is connected to conduit 342 by a conduit 350 and the outlet of relief valve 348 is connected to lube oil reservoir 324 by conduit 352.

The operation of the flameless nitrogen vaporizing unit 10 is generally as follows.

For relatively low pumping rates of nitrogen, only the first internal combustion engine 22 need be utilized. The engine 22 is started and it drives the nitrogen pump 30 which pumps the nitrogen through the flow system illustrated in FIG. 3. The flow rate of nitrogen pumped by pump 30 is controlled by controlling the speed of engine 22 and by the transmission gearing in transmission 32.

Simultaneously, exhaust gases from the engine 22 flow through the shell side of exhaust heat exchanger 42 and heat the liquid nitrogen. If too much heat is being provided by the exhaust exchanger 42 it may be partially or entirely bypassed by means of bypass conduit 74 and control valve 76.

The nitrogen then flows into coolant fluid heat exchanger 44 where it is further heated by heat transferred from the coolant fluid. Both the exchanger 42 and the coolant fluid exchanger 44 may be bypassed by means of second bypass conduit 78 and control valve 80. By watching the temperature indicated by a temperature indicator (not shown) disposed in thermowell 88, an operator may utilize the valves 76 and 80, primarily the valve 80, for fine adjustment of the temperature of the nitrogen flowing out the outlet 90 of the discharge manifold 82.

A larger but less accurate adjustment of the temperature of the nitrogen can be made by varying the load on transmission retarder 33 so as to vary the load on engine 22 and correspondingly vary the heat generated thereby in the various heat exchange systems. Simultaneously with all of this, of course, heat is transferred from the transmission 32 and transmission retarder 33 to transmission fluid and then to the coolant fluid by means of transmission cooler 54. Also, heat flows in the nitrogen pump lube oil system shown in the upper part of FIG. 5 to the nitrogen pump coolers 56 and 58. The coolant fluid is circulated by auxiliary coolant pump 262.

If all the systems connected to the first internal combustion engine 22 are not capable of providing sufficient heat for the vaporization of the desired flow rates of liquid nitrogen, then the second internal combustion engine 24 is activated. The second internal combustion engine 24 is operable independently of first internal combustion engine 22, so that the second internal combustion engine 24 may be selectively used as an auxiliary heat source in addition to first internal combustion engine 22 when the amount of heat energy transferred from the first engine 22 to the coolant fluid is insufficient to provide sufficient heat energy for heating the nitrogen to a desired temperature in the coolant heat exchanger means 44.

Once the second internal combustion engine 24 is activated, the amount of heat provided thereby may be grossly adjusted by varying the back pressure on the pumps 218, 220 and 222 by means of the discharge pressure control means 234. The fine temperature adjustment is still provided by the bypass means 78 and control valve 80.

In actual practice it is preferred that the second internal combustion engine 24 normally be kept running at an idle speed even if the first internal combustion engine is capable of providing sufficient heat for the vaporization of the desired flow rates of liquid nitrogen. This is done for two reasons.

First, it is desirable to always have second internal combustion engine 24 heated up to its normal operating tempeature, so that it is immediately available to provide additional vaporizing capacity if it is necessary to provide a sudden large increase in the flow rate of nitrogen.

Second, due to the connection of the exhausts of both engines 22 and 24 to the shell side of exhaust gas-tonitrogen heat exchanger 42, if second engine 24 is not running exhaust gases from first engine 22 will flow from exchanger 42 back into the exhaust system of second engine 24. Those gases will then flow through the open cylinders of second engine 24 and cause the rotating components of a turbocharger on the intake of second engine 24 to rotate in a reverse direction. This is undesirable since it may damage the turbocharger and may cause excess wear on the parts thereof.

Therefore, the second engine 24 is normally kept idling even when it is not being used to provide any significant portion of the required heat of vaporization of the nitrogen. Of course, even at idle the second engine 24 will provide some heat to the coolant fluid and in the exhaust gas-to-nitrogen heat exchanger 42, but in that mode of operation the heat provided is not significant compared to that being provided by first engine 22.

When it is desired to provide significant heat from second engine 24 the second engine 24 is activated merely by advancing the throttle thereof and then loading the second engine 24 as previously described.

The apparatus 10 provides pumping rates in the overall range of from 15,000 to 230,000 standard cubic feet per hour at a pump pressure of 10,000 psi.

Thus it is seen that the flameless nitrogen vaporizing skid unit of the present invention is readily adapted to attain the ends and advantages mentioned as well as those inherent within. While presently preferred embodiments of the invention have been illustrated for the purposes of the present disclosure, numerous changes in the construction and arrangement of parts may be made by those skilled in the art which changes are encompassed within the spirit and scope of this invention as defined by the appended claims.

What is claimed is:

1. An apparatus for heating a first fluid, comprising:
  a first internal combustion engine;
  a second internal combustion engine;
  a coolant system means for circulating a coolant fluid and transferring heat energy from said first and second internal combustion engines to said coolant fluid;
  a coolant fluid-to-first fluid heat exchanger means for transferring heat energy from said coolant fluid to said first fluid;
  a main pump means, drivingly connected to said first internal combustion engine, for pumping said first fluid; and
  a variable load coolant pump means, drivingly connected to said second internal combustion engine, for pumping said coolant fluid against a controlled variable discharge pressure thereby exerting a varying load on said second internal combustion engine so that an amount of heat energy transferred from said second internal combustion engine to said coolant fluid and from said coolant fluid to said first fluid increases as said discharge pressure of said coolant pump means is increased.

2. The apparatus of claim 1, wherein:
  said second internal combustion engine is operable independent of said first internal combustion engine, so that said second internal combustion engine may be selectively used as an auxiliary heat source in addition to said first internal combustion engine when an amount of heat energy transferred from said first internal combustion engine to said coolant fluid is insufficient to provide sufficient heat energy for heating said first fluid to a desired temperature in said coolant fluid-to-first fluid heat exchanger means; and
  said apparatus further includes an auxiliary coolant pump means, drivingly connected to said first power source, for pumping said coolant fluid to circulate said coolant fluid through said coolant system means when only said first internal combustion engine is being operated.

3. The apparatus of claim 2, wherein:
  said coolant system means includes a first coolant fluid conducting means for conducting said coolant fluid from said first and second internal combustion engines to said coolant fluid-to-first fluid heat exchanger means and a second coolant fluid conducting means for conducting said coolant fluid from said coolant fluid-to-first fluid heat exchanger means to said first and second internal combustion engines.

4. The apparatus of claim 3, wherein:
  said variable load coolant pump means is disposed in said first coolant fluid conducting means.

5. The apparatus of claim 1, further comprising:
  a discharge pressure control means for controlling said discharge pressure of said coolant pump means.

6. The apparatus of claim 5, further comprising:
  a coolant fluid reservoir;
  a coolant charge line connecting said reservoir to said coolant system means upstream from said coolant pump means; and
  a coolant charge pump means disposed in said coolant charge line, for supplying coolant fluid to a suction side of said coolant pump means.

7. The apparatus of claim 6, further comprising:
  a suction side relief valve, having an inlet communicated with said coolant system means on said suction side of said coolant pump means, and having an outlet communicated with said reservoir, for limiting a suction side pressure supplied to said coolant pump means.

8. The apparatus of claim 6, further comprising:
  a discharge side relief valve, having an inlet communicated with said coolant system means between a discharge side of said coolant pump means and said discharge pressure control means, and having an outlet communicated with said reservoir, for limiting said discharge pressure of said coolant pump means.

9. A method of heating a first fluid, said method comprising the steps of:
  pumping said first fluid with a main pump means;
  driving said main pump means with a first internal combustion engine;
  pumping a coolant fluid through a coolant system means with a coolant pump means;
  driving said coolant pump means with a second internal combustion engine;
  transferring heat energy from said first and second internal combustion engines to said coolant fluid;
  transferring heat energy from said coolant fluid to said first fluid in a coolant fluid-to-first fluid heat exchanger; and
  exerting a varying load on said second internal combustion engine by varying a discharge pressure of said coolant fluid against said coolant pump means, and thereby transferring an increased amount of heat energy from said second internal combustion engine to said coolant fluid and from said coolant fluid to said first fluid as said load exerted on said second internal combustion engine is increased.

10. The method of claim 9, further comprising the steps of:
operating said second internal combustion engine independently of said first internal combustion engine;
monitoring a temperature of said first fluid;
selectively activating and deactivating said second internal combustion engine in response to said temperature of said first fluid so that said second internal combustion engine is selectively used as an auxiliary heat source in addition to said first internal combustion engine when an amount of heat energy transferred from said first internal combustion engine to said coolant fluid is insufficient for heating said first fluid to a desired temperature; and
utilizing an auxiliary coolant pump means driven by said first internal combustion engine to pump said coolant fluid when said second internal combustion engine is deactivated.

* * * * *

UNITED STATES PATENT AND TRADEMARK OFFICE
CERTIFICATE OF CORRECTION

PATENT NO. : 4,458,633

DATED : Jul. 10, 1984

INVENTOR(S) : Loesch, deceased et al.

It is certified that error appears in the above-identified patent and that said Letters Patent is hereby corrected as shown below:

In column 1, line 63, delete the word [abandon] and insert therefor --U.S. Pat. No. 4,409,927--.
In column 4, line 11, delete the word [throught] and insert therefor -- through--.
In column 4, line 51, delete the word [by] and insert therefor --for--.

Signed and Sealed this

Thirtieth Day of October 1984

[SEAL]

Attest:

Attesting Officer

GERALD J. MOSSINGHOFF

Commissioner of Patents and Trademarks